US012626390B2

(12) United States Patent
Kemmotsu et al.

(10) Patent No.: US 12,626,390 B2
(45) Date of Patent: May 12, 2026

(54) POSITION ESTIMATION SYSTEM, POSITION ESTIMATION METHOD, AND PROGRAM

(71) Applicant: TOYOTA JIDOSHA KABUSHIKI KAISHA, Toyota (JP)

(72) Inventors: Masahiro Kemmotsu, Miyoshi (JP); Takuro Sawano, Nisshin (JP); Yasuyoshi Hatano, Nisshin (JP); Shogo Yasuyama, Okazaki (JP); Kento Iwahori, Nagoya City (JP); Keigo Ikeda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 395 days.

(21) Appl. No.: 18/236,208

(22) Filed: Aug. 21, 2023

(65) Prior Publication Data

US 2024/0112363 A1     Apr. 4, 2024

(30) Foreign Application Priority Data

Sep. 30, 2022     (JP) ................................. 2022-158932

(51) Int. Cl.
*G06T 7/70*       (2017.01)
*G06T 3/60*       (2024.01)
*G06T 5/80*       (2024.01)

(52) U.S. Cl.
CPC ................. *G06T 7/70* (2017.01); *G06T 3/60* (2013.01); *G06T 5/80* (2024.01);
(Continued)

(58) Field of Classification Search
CPC .... G06T 7/70; G06T 7/73; G06T 3/60; G06T 5/80; G06T 2207/20132;
(Continued)

(56) References Cited

U.S. PATENT DOCUMENTS 8,878,835 B2 * 11/2014 Birtwistle ............. G06T 11/001
345/626
2009/0290809 A1 * 11/2009 Yamada ................. H04N 19/17
382/266
(Continued)

FOREIGN PATENT DOCUMENTS

JP       2001-051720 A       2/2001

OTHER PUBLICATIONS

Tani, I et al., "Vehicle Extraction Using Geometrical Constraint," The Journal of the Institute of Image Electronics Engineers of Japan, Japan Traffic Management Technology Association, vol. 43, No. 4, pp. 579-587, issued on Sep. 30, 2014.
(Continued)

*Primary Examiner* — John B Strege
(74) *Attorney, Agent, or Firm* — OLIFF PLC

(57)          ABSTRACT

A position estimation system, a position estimation method, and a program that can estimate a position of a moving body without installing an installation object on the moving body are provided. A position estimation system includes a detection unit configured to generate a first mask image, a mask area masking a moving body in an image photographed being added to the first mask image, a perspective transformation unit configured to perform perspective transformation on the first mask image, and a position calculation unit configured to correct a coordinate point of a first circumscribed rectangle set for a mask area in the first mask image using a second coordinate point of the mask area in the second mask image, which is obtained by performing perspective transformation on the first mask, to calculate a third coordinate point.

9 Claims, 6 Drawing Sheets

(52) U.S. Cl.
    CPC .............. *G06T 2207/20132* (2013.01); *G06T 2207/30252* (2013.01); *G06V 2201/07* (2022.01)

(58) Field of Classification Search
    CPC . G06T 2207/30252; G06T 2207/30236; G06T 2207/10004; G06V 2201/07; G01B 11/002
    See application file for complete search history.

(56) References Cited

U.S. PATENT DOCUMENTS

| | | | |
|---|---|---|---|
| 2018/0189951 A1* | 7/2018 | Liston ..................... | G06T 7/194 |
| 2023/0127188 A1* | 4/2023 | Sevecek ................ | G06V 10/26 |
| | | | 382/275 |
| 2023/0245427 A1* | 8/2023 | Tsunoda .............. | G06V 10/454 |
| | | | 382/103 |
| 2024/0054804 A1* | 2/2024 | Hirakawa ................ | G06T 7/00 |
| 2024/0161520 A1* | 5/2024 | Li .......................... | G06N 3/044 |

OTHER PUBLICATIONS

Translation of Aug. 27, 2024 Office Action issued in Japanese Patent Application No. 2022-158932.

Chen, Y. et al., "Monocular Vehicle 3D Bounding Box Estimation Using Homograhy and Geometry in Traffic Scene," ICASSP 2022-2022 IEEE International Conference On Acoustics, Speech and Signal Processing (ICASSP), IEEE, pp. 1995-1999.

Kocur, V. et al., "Detection of 3D bounding boxes of vehicles using perspective transformation for accurate speed measurement," Machine Vision and Applications, Springer Verlag, DE, vol. 31, No. 7-8.

\* cited by examiner

POSITION ESTIMATION SYSTEM, POSITION ESTIMATION METHOD, AND PROGRAM

CROSS REFERENCE TO RELATED APPLICATIONS

This application is based upon and claims the benefit of priority from Japanese patent application No. 2022-158932, filed on Sep. 30, 2022, the disclosure of which is incorporated herein in its entirety by reference.

BACKGROUND

The present disclosure relates to a position estimation system, a position estimation method, and a program. In particular, the present disclosure relates to a position estimation system, a position estimation method, and a program for moving bodies including vehicles.

A technique for detecting positions of vehicles is disclosed in, for example, Japanese Unexamined Patent Application Publication No. 2001-51720.

Japanese Unexamined Patent Application Publication No. 2001-51720 discloses a vehicle position detection apparatus including transmitting and receiving means installed on two predetermined positions on a vehicle, four returning means installed on at least three fixed points in a parking space of the vehicle, and control means connected to each transmitting and receiving means, each of the transmitting and receiving means communicating with two different returning means to detect a distance between them, and the control means calculating a vehicle position based on the distance detected by each transmitting and receiving means.

SUMMARY

However, since the technology described in Japanese Unexamined Patent Application Publication No. 2001-51720 requires each of the vehicle and the parking space to have an installation object, there is a problem that it is not possible to estimate a position of a moving body, for example, when a position of a moving body or a space where an installation object cannot be installed is to be estimated.

The present disclosure has been made to solve such a problem and an object thereof is to provide a position estimation system, a position estimation method, and a program that can estimate a position of a moving body without installing an installation object on the moving body.

A position estimation system according to an embodiment includes: an imaging unit configured to photograph an imaging area including a target moving body; a detection unit configured to generate a first mask image, a mask area masking the moving body in the image photographed by the imaging unit being added to the first mask image; a perspective transformation unit configured to perform perspective transformation on the first mask image; and a position calculation unit configured to set as a first coordinate point a specified vertex of a first circumscribed rectangle set in the mask area in the first mask image, set as a second coordinate point a vertex indicating the same position as that of the first coordinate point among vertices of a second circumscribed rectangle set in the mask area in a second mask image obtained by performing the perspective transformation on the first mask image, and correct the first coordinate point using the second coordinate point to calculate a third coordinate point indicating a position of the moving body in the image coordinate system.

A position estimation method according to the embodiment includes: photographing, by an imaging unit, an imaging area including a target moving body; generating a first mask image, a mask area masking the moving body in the image photographed by the imaging unit being added to the first mask image; performing perspective transformation on the first mask image; and setting as a first coordinate point a specified vertex of a first circumscribed rectangle set in the mask area in the first mask image, setting as a second coordinate point a vertex indicating the same position as that of the first coordinate point among vertices of a second circumscribed rectangle set in the mask area in a second mask image obtained by performing the perspective transformation on the first mask image, and correcting the first coordinate point using the second coordinate point to calculate a third coordinate point indicating a position of the moving body in the image coordinate system.

A program according to the embodiment causes a computer to execute processing of: photographing, by an imaging unit, an imaging area including a target moving body; generating a first mask image, a mask area masking the moving body in the image photographed by the imaging unit being added to the first mask image; performing perspective transformation on the first mask image: and setting as a first coordinate point a specified vertex of a first circumscribed rectangle set in the mask area in the first mask image, setting as a second coordinate point a vertex indicating the same position as that of the first coordinate point among vertices of a second circumscribed rectangle set in the mask area in a second mask image obtained by performing the perspective transformation on the first mask image, and correct the first coordinate point using the second coordinate point to calculate a third coordinate point indicating a position of the moving body in the image coordinate system.

According to the present disclosure, it is possible to provide a position estimation system, a position estimation method, and a program that can estimate a position of a moving body without installing an installation object on the moving body.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
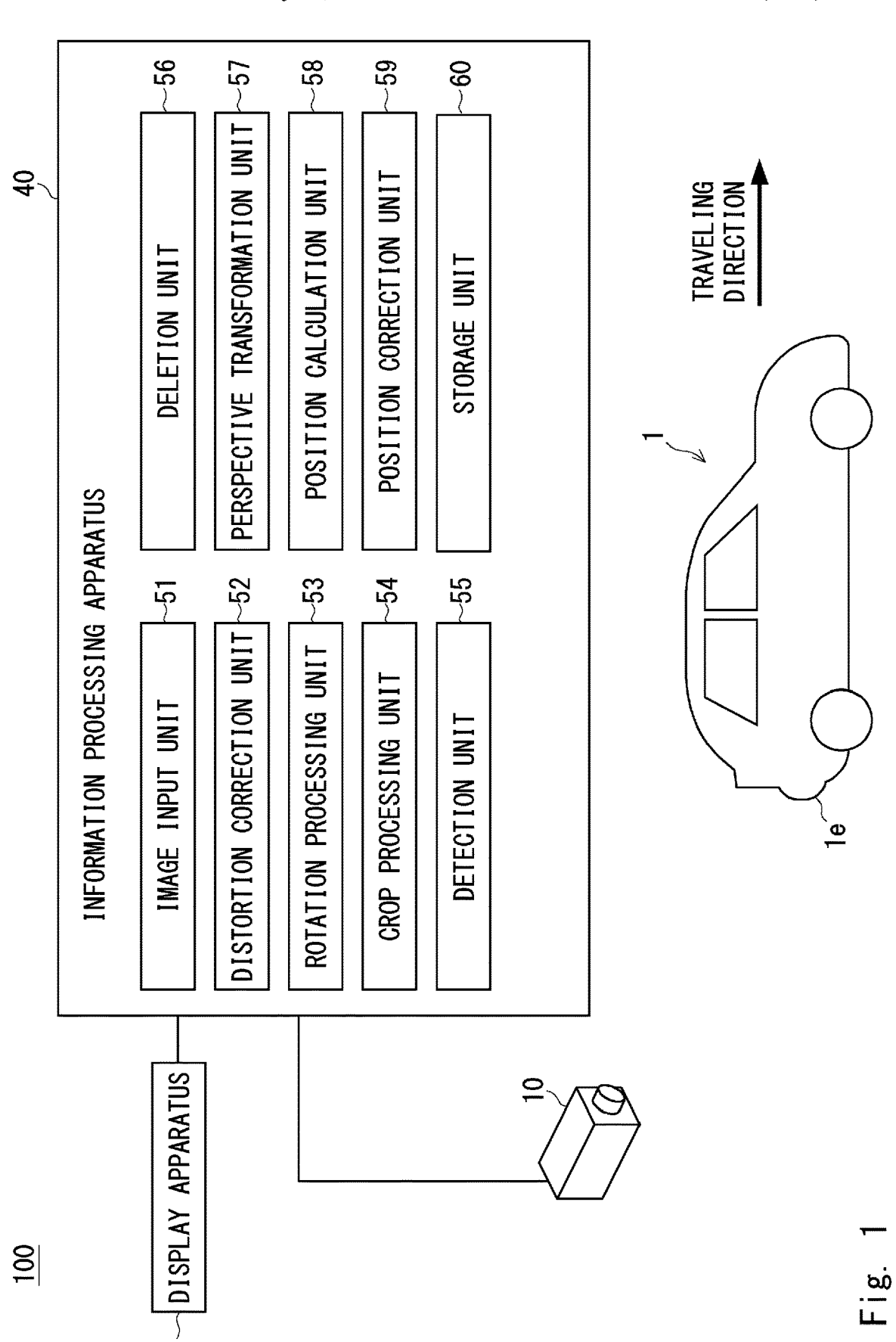
FIG. 1 shows an overview of the position estimation system according to a first embodiment.

An embodiment of the present disclosure is described below with reference to the drawings. However, the present disclosure is not limited to the following embodiment. In addition, the following descriptions and drawings have been simplified, as appropriate, for clarity.

As an example of a moving body subject to position estimation by a position estimation system 100 according to this embodiment, the following description will be made specifically with respect to a case where a moving body is a vehicle 1 such as a car. However, the position estimation system 100 is applicable to position estimation of various moving bodies other than vehicles. The moving body may be, for example, a road-traveling type robot.

In the following description, a direction parallel to a traveling direction of the vehicle 1 is referred to as a front-rear direction, a horizontal direction perpendicular to the front-rear direction is referred to as a left-right direction, and a direction perpendicular to the front-rear direction and the left-right direction is referred to as an up-down direction. In the front-rear direction, a traveling direction of the vehicle 1 is referred to as front and a direction opposite to the front is referred to as rear. The black arrow in the drawing indicates the traveling direction.

An overview of the position estimation system 100 according to this embodiment will be described with reference to FIG. 1. FIG. 1 shows an overview of the position estimation system according to the first embodiment. As shown in FIG. 1, the position estimation system 100 has a camera 10, a display apparatus 30, an information processing apparatus 40, and so on, and estimates a position of the target vehicle 1.

The vehicle 1 moves (travels) along the traveling direction on a road surface 71 of a flat moving path where grid lines 70 are drawn in a mesh pattern along each of an Xg axis parallel to the traveling direction and a Yg axis perpendicular to the traveling direction. The Xg axis and the Yg axis are coordinate axes of a global coordinate system. Such grid lines 70 may be omitted.

The position estimation system 100 employs a position of a positioning point set for a specific part of the vehicle 1 as the position of the vehicle 1. In this embodiment, the positioning point of the vehicle 1 is a left rear vehicle end 1e of the vehicle 1.

The camera 10 is a specific example of an imaging unit. The camera 10 is communicably connected to the information processing apparatus 40 wirelessly or by wire. The camera 10 has an image sensor such as a CCD (Charge Coupled Device) image sensor or a CMOS (Complementary Metal Oxide Semiconductor) image sensor and an optical system. In this embodiment, the camera 10 is fixed outside the vehicle 1 at a position where the vehicle 1 moving on the road surface 71 can be photographed from above the left rear of the vehicle 1. The camera 10 photographs an imaging area including the vehicle 1 at a predetermined imaging cycle. In this embodiment, a case where the camera 10 photographs the imaging area including the vehicles 1 and 2 will be described as an example.

The camera 10 generates an image showing the imaging area. The image is a two-dimensional image in which pixels arranged on an XcYc plane are assembled, and includes at least two-dimensional data of the vehicle 1. The image is preferably a color image, but may be a gray image. Each time an image is generated, for example, the camera 10 outputs to the information processing apparatus 40 an image acquisition time at which the image has been acquired along with the generated image.

The display apparatus 30 displays various kinds of information to the user. The display apparatus 30 is composed of, for example, a Liquid Crystal Display (LCD) or an Organic Electroluminescence Display (OELD). The display apparatus 30 is communicably connected to the information processing apparatus wirelessly or by wire.

The information processing apparatus 40 has a normal computer hardware configuration having, for example, a processor such as a CPU (Central Processing Unit) or GPU (Graphics Processing Unit), a memory such as RAM (Random Access Memory) or ROM (Read Only Memory), an input/output I/F for connecting a storage device such as an HDD (Hard Disk Drive) or SSD (Solid State Drive), and peripheral devices such as the display apparatus 30, and a communication I/F for communicating with devices outside the apparatus.

The information processing apparatus 40 processes the image photographed by the camera 10 to estimate (calculate) the position of the vehicle 1. The information processing apparatus 40 has an image input unit 51, a distortion correction unit 52, a rotation processing unit 53, a crop processing unit 54, a detection unit 55, a deletion unit 56, a perspective transformation unit 57, a position calculation unit 58, a position correction unit 59, and a storage unit 60. The image input unit 51, the distortion correction unit 52, the rotation processing unit 53, the crop processing unit 54, the deletion unit 56, the position correction unit 59, and the storage unit 60 can be omitted as appropriate.

The image input unit 51 accepts an input of an image from the camera 10. The distortion correction unit 52 corrects distortion of the image. The rotation processing unit 53 rotates the image so that a vector direction of the vehicle 1 is directed to a predetermined direction. When the vehicle 1 has moved a distance exceeding a predetermined threshold, the crop processing unit removes a moved area corresponding to a distance which the vehicle 1 has moved from the image and cuts out an area where the moving body has not moved (the area is hereinafter referred to as an unmoved area) including the moving body.

The detection unit 55 generates a first mask image 15 to which a mask area M1 masking the vehicle 1 in the image is added. The perspective transformation unit 57 performs perspective transformation on the first mask image 15.

First, the position calculation unit 58 acquires a specified vertex of a first circumscribed rectangle R1 set in the mask area M1 in the first mask image 15 as a first coordinate point P1. Also, among vertices of a second circumscribed rectangle R2 set in the mask area M1 in a second mask image 17 obtained by perspective transformation of the first mask image 15, a vertex indicating the same position as that of the first coordinate point P1 is acquired as a second coordinate point P2. The first coordinate point P1 is corrected using the second coordinate point P2 to calculate a third coordinate point P3 indicating the position of the vehicle 1 in the image coordinate system.

The position correction unit 59 calculates the position of the vehicle 1 in the global coordinate system by applying the position of the camera 10 in the global coordinate system to correct the third coordinate point P3.

The storage unit 60 is composed of, for example, a memory provided in the information processing apparatus 40. The storage unit 60 stores various programs executed by the information processing apparatus 40, various data such as images obtained from the camera 10, various parameters, and so on. The program stored in the storage unit 60 includes at least a part of the program in which the processing of the position estimation method according to this embodiment is implemented. In addition, the storage unit 60 stores a two-dimensional map of the global coordinate system including an imaging coordinate point Pc and a fixed coordinate point Pf used for position estimation, information indicating a height H of the camera 10, information indicating a height h of the vehicle end 1*e*, calculation results obtained during the position estimation, and so on.

Figure 2:
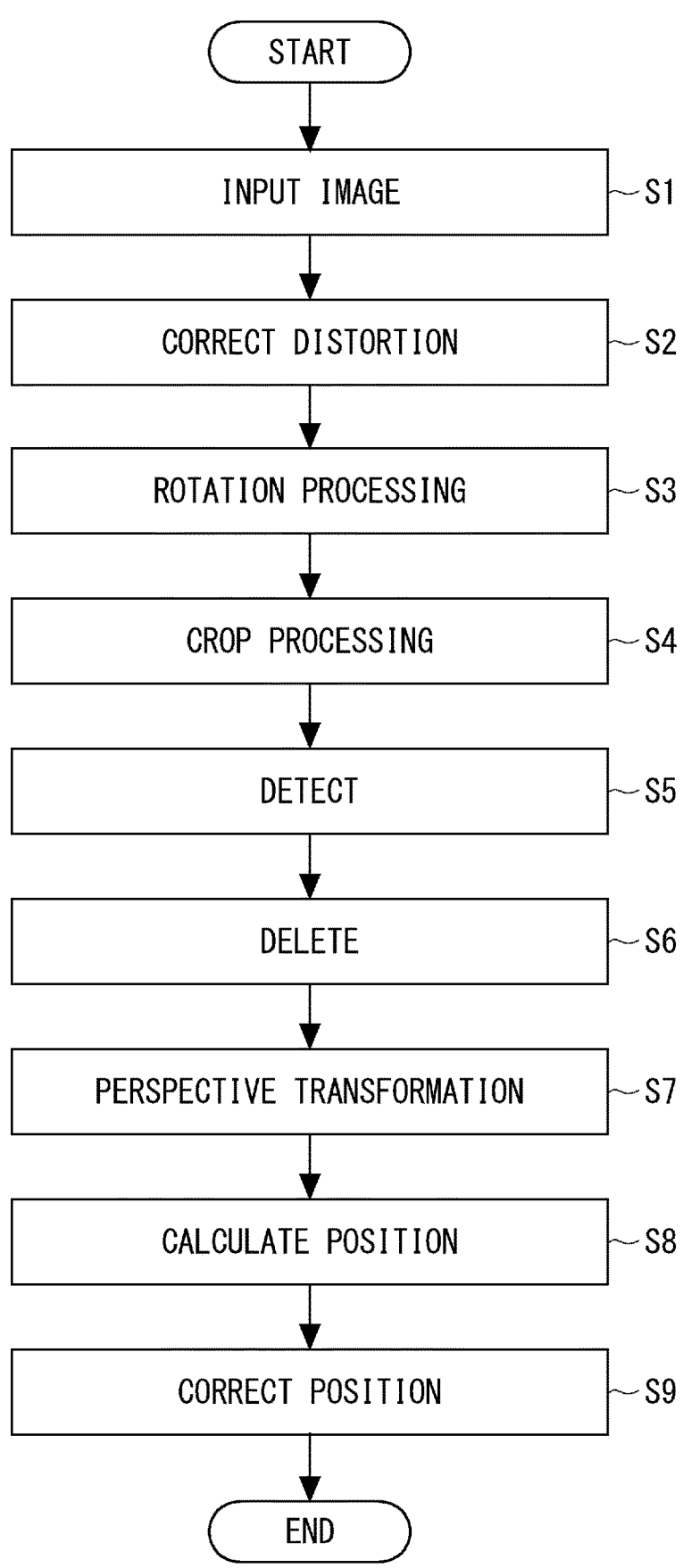
FIG. 2 is a flowchart for explaining an example of a position estimation method using the position estimation system.
Figure 3:
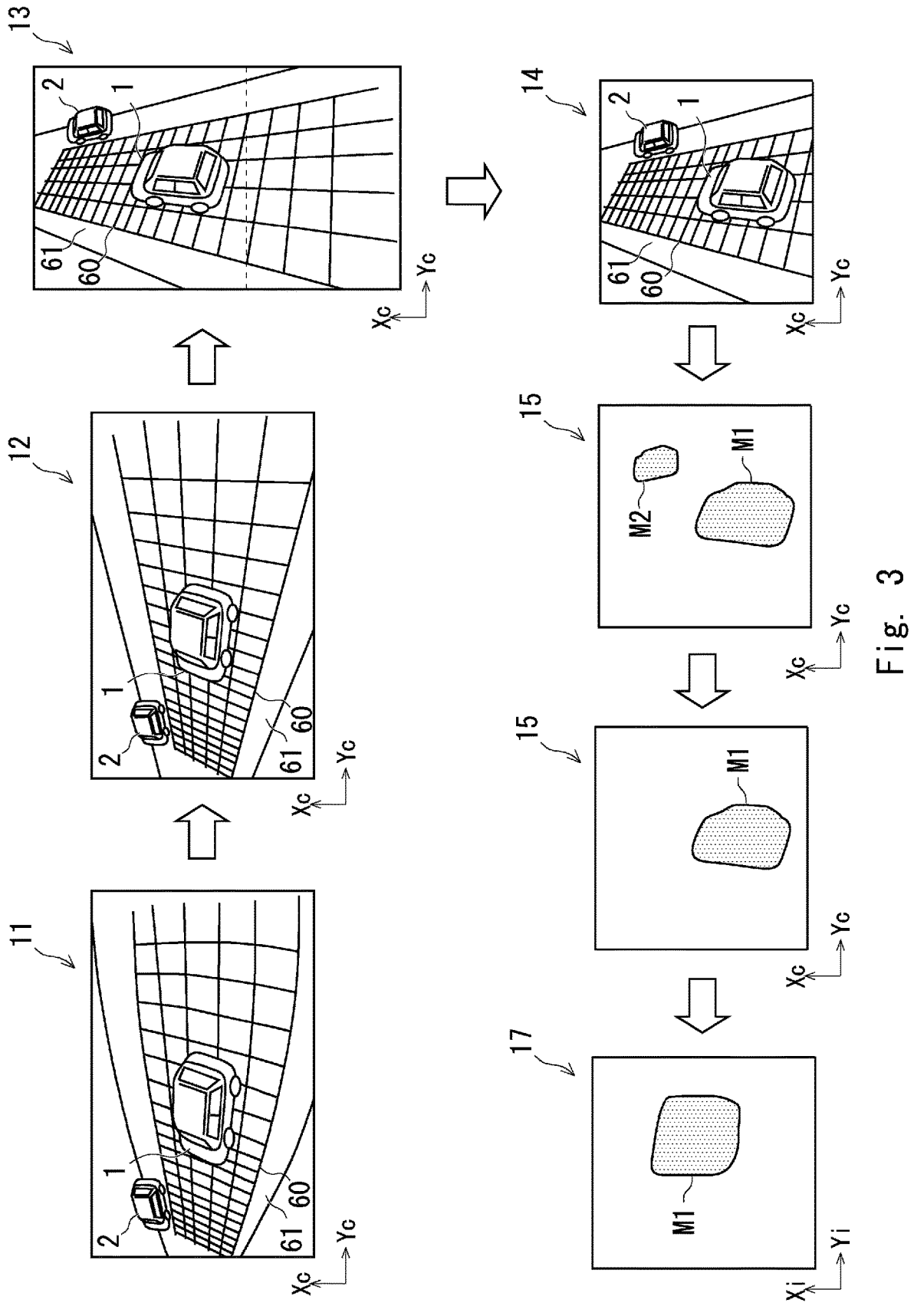
FIG. 3 is a schematic diagram showing examples of various images.

A user can perform the position estimation of the vehicle 1 using the position estimation system 100 described above. The position estimation method using the position estimation system 100 will be described with reference to FIGS. 2 and 3. FIG. 2 is a flowchart showing an example of the position estimation method using the position estimation system. FIG. 3 is a schematic diagram showing examples of various images. In the following description, before the mask area M1 is added by the detection unit 55, the images obtained in each process are respectively referred to as images 11 to 14.

First, in Step S1, the image input unit 51 accepts an input of the image 11 from the camera 10. The image 11 acquired from the camera 10 may include two-dimensional data of a plurality of vehicles including the vehicle 1. The image 11 shown as an example in FIG. 2 includes two-dimensional data of the vehicles 1 and 2. If such processing by the image input unit 51 is not required, Step S1 can be omitted.

In Step S2, the distortion correction unit 52 corrects distortion of the image 11. In this step, the image 12 can be generated by correcting the distortion of the image 11 using distortion correction parameters stored in advance in the storage unit 60. The distortion correction parameters are, for example, parameters related to the position information of the grid lines 70 obtained by calibration. Any parameters other than the grid lines 70 may be employed. If such processing by the distortion correction unit 52 is not required, Step S2 can be omitted.

In Step S3, the rotation processing unit 53 rotates the image 12 so that the vector direction of the vehicle 1 is directed to the predetermined direction. In this step, for example, the image 13 is generated by rotating the image 12 around a center of gravity of the vehicle 1 in the image 12 so that the vector direction, which is the traveling direction of the vehicle 1, is directed upward on the screen of the display apparatus 30 displaying the image 12. If such processing by the rotation processing unit 53 is not required, Step S3 can be omitted.

Here, the movements of the feature points of the vehicle 1 can be expressed by a vector using, for example, the optical flow method. The vector quantity and the vector direction of the vehicle 1 are estimated based on a change in the position of the feature points (center of gravity C) of the vehicle 1, which are set appropriately on the image 11, between image frames.

In Step S4, when the vehicle 1 has moved a distance exceeding a predetermined threshold, the crop processing unit 54 removes the moved area corresponding to the distance which the vehicle 1 has moved from the image 13 and generates the image 14 in which the unmoved area including the vehicle 1 is cut out. The crop processing unit 54 recognizes the distance which the vehicle 1 has moved according to the estimated vector quantity.

The moved area shown as an example in FIG. 3 is the area indicated by the dashed line in the image 13. In this way, the accuracy of image processing for the vehicle 1 which is distant from the camera 10 is improved. If such processing by the crop processing unit 54 is not required. Step S4 can be omitted. The processing by the crop processing unit 54 in Step S4 may be performed before the processing by the rotation processing unit 53 in Step S3.

In Step S5, the detection unit 55 generates the first mask image 15 to which the mask area M1 masking the vehicle 1 in the image 14 is added. In this step, the vehicle 1 in the image 14 is masked using a trained model. For example, by inputting the image 14 to a pre-machine-trained discriminator to mask the vehicle in the input image, the first mask image 15 with the mask area M1 indicating the area of the vehicle 1 added to the image 14 can be output.

As such a discriminator, a DNN (Deep Neural Network) with the structure of a CNN (Convolutional Neural Network) that implements semantic segmentation and instance segmentation can be used. The discriminator may be a neural network for object detection or it may be a discriminator according to a machine training model other than a neural network.

An example of such a discriminator is a DNN that performs instance segmentation such as YOLACT++. When such a DNN is used, a plurality of vehicles included in the image 14 can be classified, and the first mask image 15 can be generated for each vehicle 1 and 2. In this embodiment, the first mask images are generated by adding the mask areas M1 and M2 indicating areas for each of the masked vehicles 1 and 2 to the image 14. Thus, deterioration in position estimation accuracy due to background diversity can be suppressed, and the target vehicle 1 can be selected when a plurality of vehicles are included in the image 14.

The first mask images 15 are preferably binarized images in which binarization processing is performed after the mask areas M1 and M2 are added to the image 14. In Step S5, the first mask images 15 may be generated by adding the mask areas M1 and M2 to the image 13 instead of the image 14.

In Step S6, when the first mask image 15 includes a plurality of vehicles, the deletion unit 56 deletes the masked, untargeted vehicle 2 from the first mask image 15. In this step, among the mask areas M1 and M2 generated in Step S5, the mask area M2 present outside a recognition target area is deleted from the first mask image 15. The recognition target area is a predetermined area where the vehicle 1 moves in the first mask image 15 and is stored in advance in the storage unit 60. For example, the recognition target area corresponding to the area in the grid lines 70 is set.

As a result, an influence of the vehicle 2, which is not subjected to the position estimation, can be eliminated when a plurality of vehicles are photographed in the image, so that the position estimation accuracy of the vehicle 1 is improved. If the processing by the deletion unit 56 is not required, such as when the vehicle 2 is not present, Step S6 may be omitted.

In Step S7, the perspective transformation unit 57 performs perspective transformation on the first mask image 15. In Step S7, the first mask image 15 generated in Step S5 may be a target of the processing, and the first mask image 15 from which the vehicle 2 is deleted in Step S6 may be a target of the processing.

In this step, using the perspective transformation parameters stored in advance in the storage unit 60, the first mask image 15 is perspective transformed into a bird's-eye image viewed from a viewpoint above the vehicle 1 (e.g., directly above the vehicle 1), which is substantially perpendicular to the road surface 71.

Thus, the camera coordinate system having the coordinate axes indicated by Xc and Yc with a focus of the camera 10 as an origin is transformed into the image coordinate system having the coordinate axes indicated by Xi and Yi with one point of an image plane projected by the perspective transformation as an origin. The perspective transformation parameters are, for example, parameters related to the positional information and internal parameters of the camera 10 obtained by calibration.

In Step S8, the position calculation unit 58 first acquires the specified vertex of the first circumscribed rectangle R1 set in the mask area M1 in the first mask image 15 as the first coordinate point P1. Also, among vertices of a second circumscribed rectangle R2 set in the mask area M1 in the second mask image 17 obtained by perspective transformation of the first mask image 15, the vertex indicating the same position as that of the first coordinate point P1 is acquired as the second coordinate point P2. The first coordinate point P1 is corrected using the second coordinate point P2 to calculate a third coordinate point P3 indicating the (estimated) position of the vehicle 1 in the image coordinate system.

Figure 4:
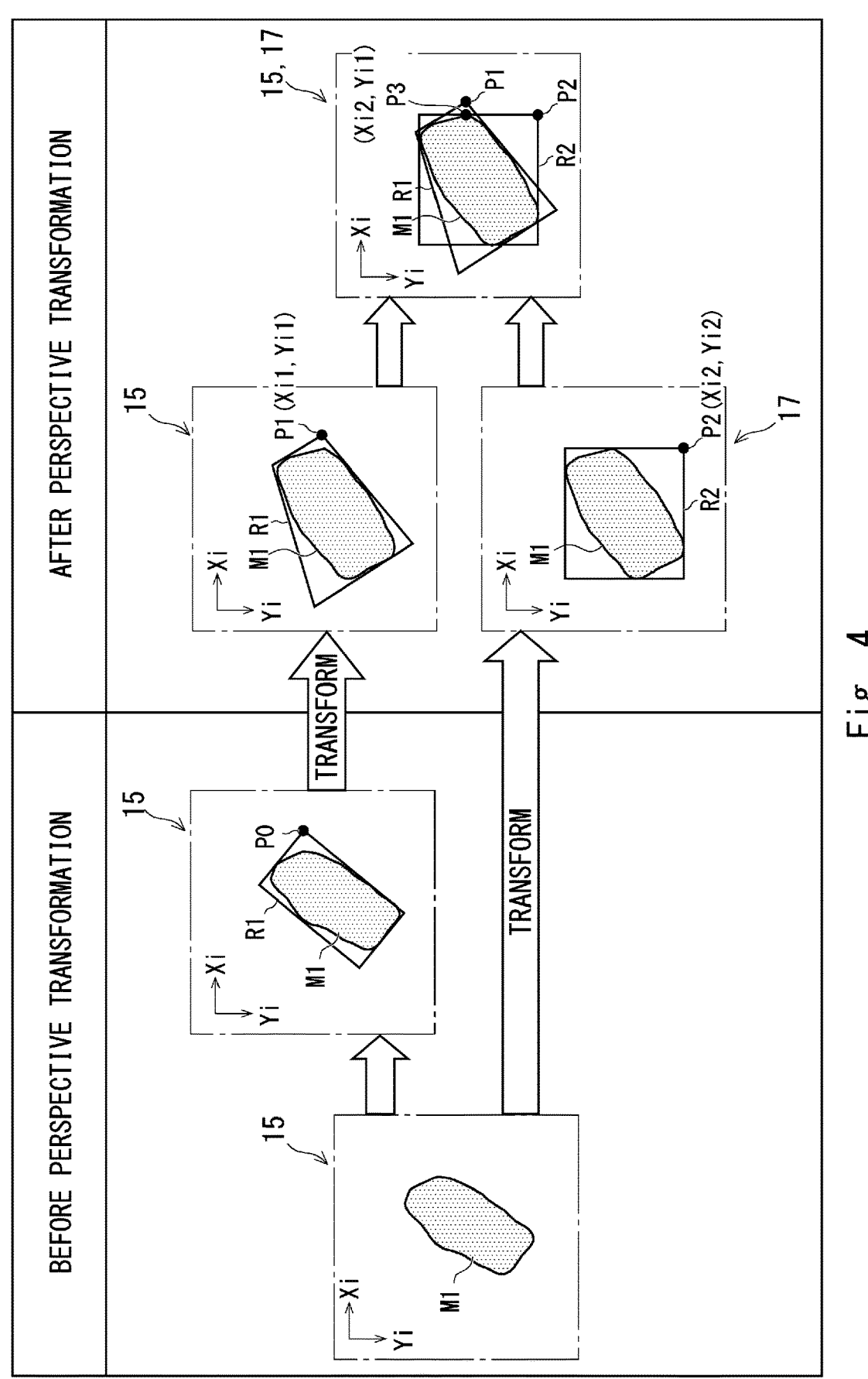
FIG. 4 is a first diagram for explaining Step S8.
Figure 5:
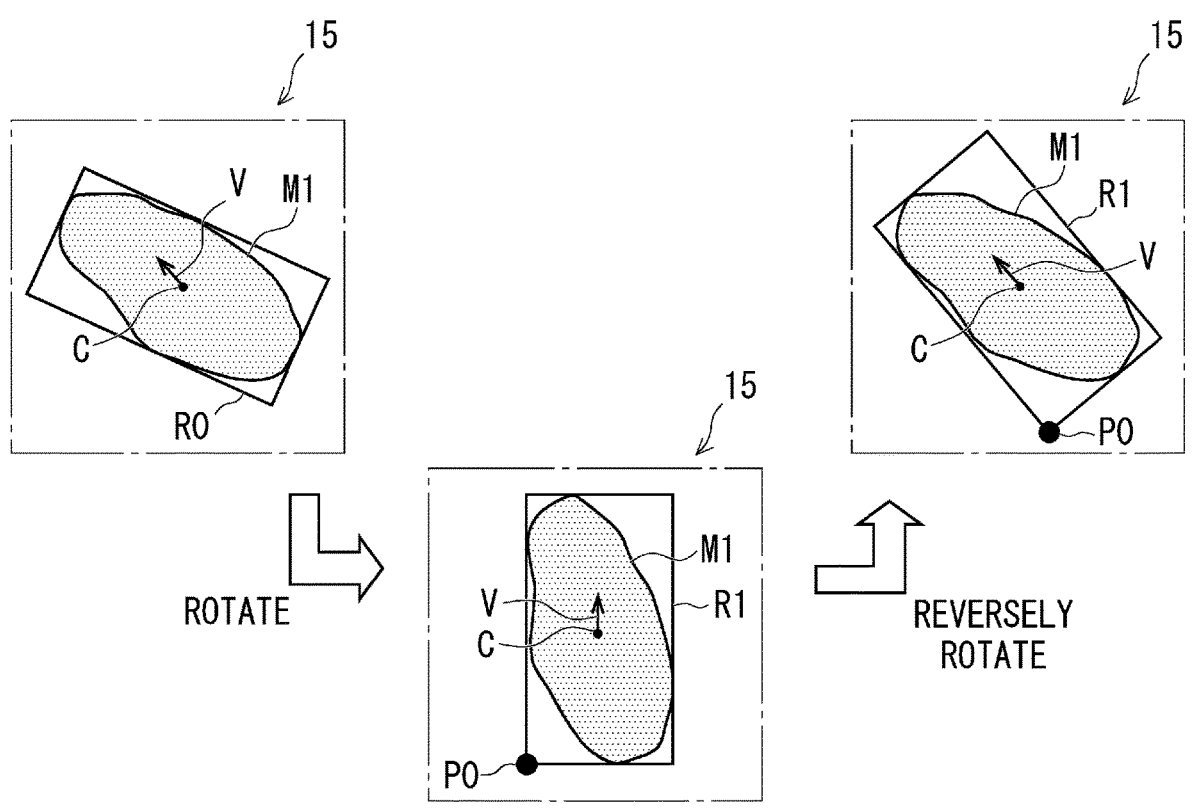
FIG. 5 is a second diagram for explaining Step S8.

The details of Step S8 will be described with reference to FIGS. 4 and 5. FIG. 4 is a first diagram for explaining Step S8. FIG. 5 is a second diagram for explaining Step S8. As shown in FIG. 4, in Step S8, the third coordinate point P3 used for calculating the position of the vehicle 1 is calculated.

In calculating the third coordinate point P3, the first mask image 15 to which the first circumscribed rectangle R1 set for the mask area M1 in the first mask image 15 is added is transformed through perspective, and the first coordinate point P1 of the first circumscribed rectangle R1 deformed by the transformation is acquired. In addition, the second coordinate point P2 of the second circumscribed rectangle R2 set for the mask area M1 in the second mask image 17 is acquired.

Using the coordinates (Xi1, Yi1) and (Xi2, Yi2) of the first coordinate point P1 and the second coordinate point P2 thus acquired, the third coordinate point P3 is calculated. The third coordinate point P3 can be calculated by replacing the coordinates (Xi1, Yi1) of the first coordinate point P1 with the coordinates (Xi2, Yi2) of the second coordinate point P2 as necessary. Specifically, if Xi1>Xi2, Xi1 is replaced with Xi2. If Yi1>Yi2, Yi1 is replaced with Yi2. The coordinate point P3 shown as an example in FIG. 4 has coordinates (Xi2, Yi1). Such correction improves the position estimation accuracy of the vehicle 1.

Here, a method for acquiring the first coordinate point P1 and the second coordinate point P2 is described. First, in order to acquire the first coordinate point P1, a base coordinate point P0 is acquired from the first circumscribed rectangle R1 before the perspective transformation. FIG. 5 shows a method of acquiring the base coordinate point P0.

As shown in FIG. 5, first, a circumscribed rectangle R0 is set for the mask area M1 in the first mask image 15. Next, the first mask image 15 is rotated by a required amount of rotation with a center of gravity C of the mask area M1 as the center of rotation so that the vector direction of the moving vector V of the vehicle 1 corresponding to the mask area M1 in the first mask image 15 is directed to a predetermined direction (i.e., upward direction on the screen).

After setting the first circumscribed rectangle R1 (the first circumscribed rectangle R1 whose long side is parallel to the vector direction of the moving vector V) for the mask area M1 in the first mask image 15 rotated in this way, the first mask image 15 to which the first circumscribed rectangle R1 is added is reversely rotated by the above amount of rotation with the center of gravity C of the mask area M1 as the center of rotation. The base coordinate point P0 of the first circumscribed rectangle R1 in the first mask image 15 thus reversely rotated is obtained. The base coordinate point P0 acquired here is one of the four vertices of the first circumscribed rectangle R1, and the vertex having the closest coordinate to the vehicle end 1e is selected.

Next, as shown in FIG. 4, the perspective transformation is performed on the reversely-rotated first mask image 15, and the coordinates (Xi1, Yi1) of the first coordinate point P1 of the first circumscribed rectangle R1 deformed by the perspective transformation are acquired. The first coordinate point P1 acquired here is the coordinate point corresponding to the base coordinate point P0.

As shown in FIG. 4, in order to acquire the second coordinate point P2, the second circumscribed rectangle R2 is set for the mask area M1 in the second mask image 17, and the coordinates (Xi2, Yi2) of the second coordinate point P2 of the second circumscribed rectangle R2 are acquired. The second coordinate point P2 acquired here is one of the four vertices of the second circumscribed rectangle R2, and the vertex having the closest coordinate to the vehicle end 1e is selected. That is, the first coordinate point P1 and the second coordinate point P2 have a correlation with each other, because they are coordinate points indicating the same position.

Figure 6:
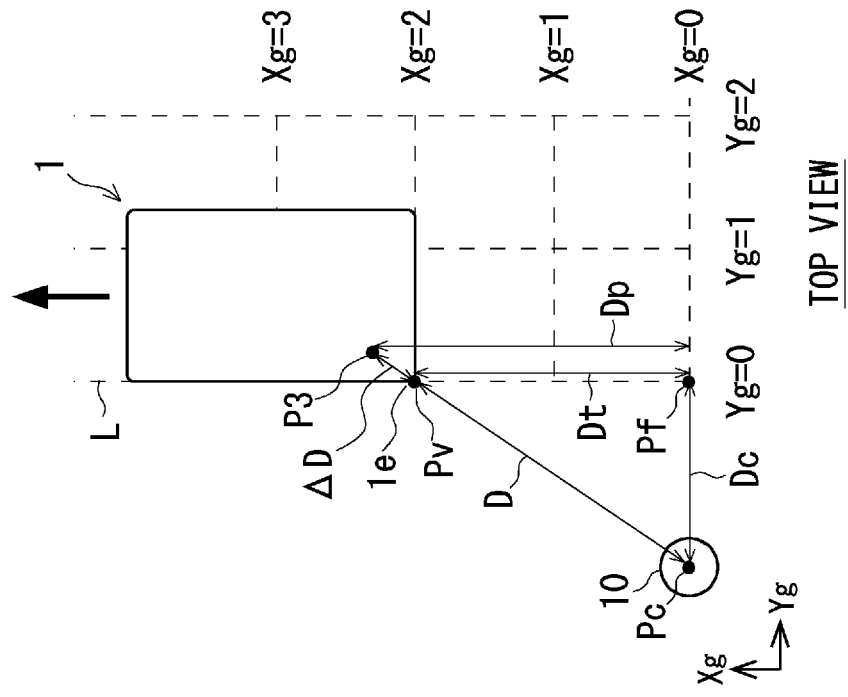
FIG. 6 is a diagram for explaining Step S9.
Figure 6:
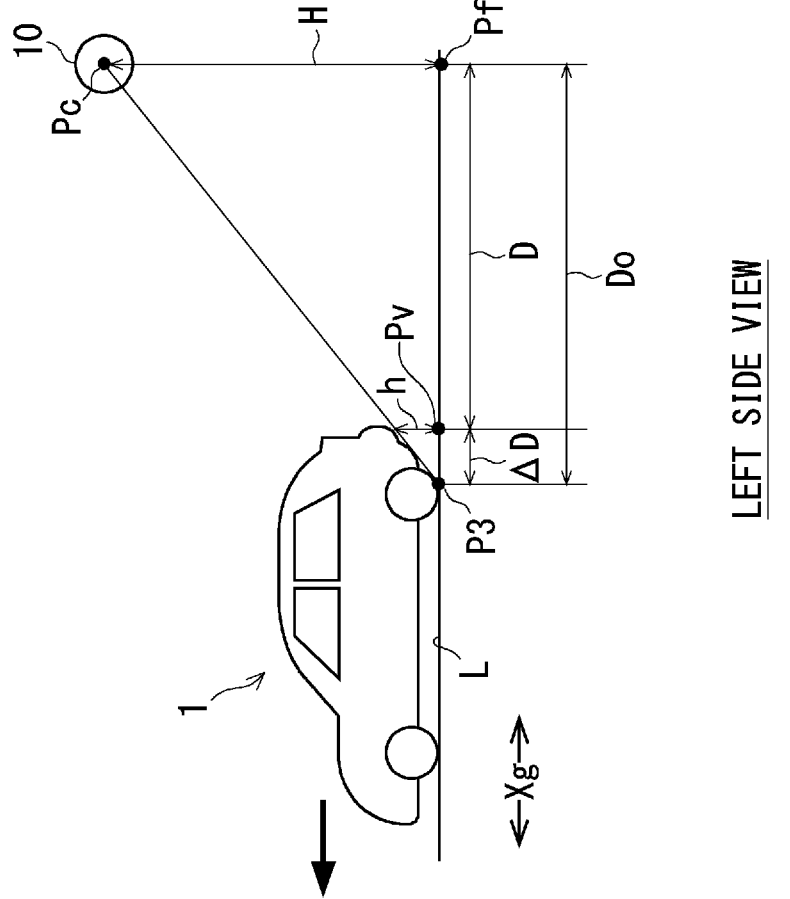

In Step S9, the position correction unit 59 calculates the position of the vehicle 1 in the global coordinate system by applying the position of the camera 10 in the global coordinate system to correct the third coordinate point P3. Details of Step S9 will be described with reference to FIG. 6. FIG. 6 is a diagram for explaining Step S9.

The global coordinate system shown in FIG. 6 is a coordinate system having coordinate axes indicated by Xg and Yg with the fixed coordinate point Pf as the origin indicating a predetermined reference position of the road surface 71. The imaging coordinate point Pc indicates the position of the camera 10 in the global coordinate system. The fixed coordinate point Pf and the imaging coordinate point Pc are stored in advance in the storage unit 60. In this step, a vehicle coordinate point Pv indicating the position of the vehicle 1 is calculated.

As shown in the left side view of FIG. 6, when an observation distance between the position of the camera 10 and the position of the vehicle 1 is Do, an observation error is $\Delta D$, the height [m] of the camera 10 from the road surface 71 is H. and a height [m] of the vehicle end 1e from the road surface 71 is h, the observation error $\Delta D$ can be expressed by the following Expression (1):

$$\Delta D = h/H \times Do \qquad \text{Expression (1)}$$

That is, the larger the observation distance Do, the larger the observation error $\Delta D$ becomes. The height H of the camera 10 and the height h of the vehicle end 1e are stored in advance in the storage unit 60.

Next, when an actual distance D between the position of the camera 10 and the position of the vehicle end 1e is D, the actual distance D can be expressed by the following Expression (2):

$$D = Do \times (1 - h/H) \qquad \text{Expression (2)}$$

That is, the actual distance D is determined by the observation distance Do, the height H of the camera 10, and the height h of the vehicle end 1e.

As shown in the top view of FIG. 6, when an estimated distance between a reference position and the estimated position of the vehicle 1 is Dp and an actual distance between the reference position and the position of the vehicle 1 is Dt, the actual distance Dt can be expressed by the following Expression (3).

$$Dt = Dp \times (1 - h/H) \qquad \text{Expression (3)}$$

Here, the estimated distance Dp can be calculated using the actual distance Dc obtained from the coordinate points Pf and Pc, and the coordinate points P3 and Pf.

Therefore, the vehicle coordinate point Pv can be calculated using the actual distance Dt and the fixed coordinate point Pf obtained by correcting the estimated distance Dp using Expression (3). The vehicle coordinate point Pv thus calculated corresponds to the position of the vehicle 1 in the real space. However, since the higher the position of the camera 10, the higher the height H becomes, a correction value indicated by h/H in Expression (3) can be reduced so as to approach 0. In this way, if the processing by the position correction unit 59 is not required, such as when the camera 10 is placed so high that no correction is required, Step S9 may be omitted.

As described above, the position estimation system 100 according to this embodiment includes: an imaging unit (camera 10) configured to photograph an imaging area including a target moving body (vehicle 1), the rotation processing unit 53 configured to rotate an image photographed by the imaging unit so that the vector direction of the moving body is directed to a predetermined direction, the detection unit 55 configured to generate the first mask image 15, the mask area M1 masking the moving body in the image photographed by the imaging unit being added to the first mask image 15; the perspective transformation unit 57 configured to perform perspective transformation on the first mask image 15; the position calculation unit 58 configured to set as the first coordinate point P1 the specified vertex of the first circumscribed rectangle R1 set in the mask area M1 in the first mask image 15, set as the second coordinate point P2 the vertex indicating the same position as that of the first coordinate point P1 among vertices of the second circumscribed rectangle R2 set in the mask area M1 in the second mask image 17 obtained by performing the perspective transformation on the first mask image 15, and correct the first coordinate point P1 using the second coordinate point P2 to calculate the third coordinate point P3 indicating the position of the moving body in the image coordinate system, and the position correction unit 59 configured to calculate the position of the moving body in a global coordinate system by applying a position of the imaging unit in the global coordinate system to correct the third coordinate point P3.

With such a configuration, it is possible to provide a system that can estimate a position of a moving body without installing on the moving body an installation object such as a sensor, marker, or transmitter/receiver used for estimating the position of the moving body. Moreover, it is not necessary to mount the position estimation system 100 on the moving body, and it is more versatile than other systems that require at least some functions for holding and processing data to be mounted on the moving body.

The above position estimation system 100 further includes the distortion correction unit 52 that corrects distortion of images. With such a configuration, the position estimation accuracy of the moving body is improved.

The above position estimation system 100 further includes the crop processing unit 54 that, when the moving body has moved a distance exceeding a predetermined threshold, removes a moved area corresponding to a distance which the moving body has moved from the image and cuts out the unmoved area including the moving body. With such a configuration, the position estimation accuracy of the moving body is improved.

The position estimation system 100 further includes the deletion unit 56 that deletes from the first mask image 15 an untargeted moving body masked by the detection unit 55 when the first mask image 15 contains a plurality of moving bodies. With such a configuration, the position estimation accuracy of the moving body is improved.

The moving body described above is the vehicle 1. Here, as a system capable of positioning a position of a moving body such as a vehicle in an outdoor space, for example, a system using GPS (Global Positioning System) can be used. However, in an indoor space or the like with a shielding effect where data from GPS satellites is difficult to reach, there is a problem that the position accuracy calculated by the system using GPS is degraded. In contrast, according to this embodiment, the position of the vehicle 1 can be estimated even in an environment where the use of GPS is undesirable. Therefore, the position estimation system 100 described above can be suitably used for the position estimation of the vehicle 1 present in an indoor space such as a vehicle factory.

Further, the position estimation method according to this embodiment includes: photographing, by the imaging unit, the imaging area including the target moving body; rotating the image photographed by the imaging unit so that the vector direction of the moving body is directed to the predetermined direction, generating the first mask image 15, a mask area M1 masking the moving body in the image photographed by the imaging unit being added to the first mask image 15; performing perspective transformation on the first mask image 15; setting as the first coordinate point Pt the specified vertex of the first circumscribed rectangle R1 set in the mask area M1 in the first mask image 15, setting as the second coordinate point P2 the vertex indicating the same position as that of the first coordinate point P1 among vertices of the second circumscribed rectangle R2 set in the mask area M1 in the second mask image 17 obtained by performing the perspective transformation on the first mask image 15, and correcting the first coordinate point P1 using the second coordinate point P2 to calculate the third coordinate point P3 indicating the position of the moving body in the image coordinate system, and calculating the position of the moving body in a global coordinate system by applying a position of the imaging unit in the global coordinate system to correct the third coordinate point P3.

With such a configuration, it is possible to provide a method for estimating a position of a moving body without installing on the moving body an installation object such as a sensor, marker, or transmitter/receiver used for estimating the position of the moving body.

Furthermore, a program according to this embodiment causes a computer to execute processing of: photographing, by the imaging unit, the imaging area including the target moving body; rotating the image photographed by the imaging unit so that the vector direction of the moving body is directed to the predetermined direction, generating the first mask image 15, a mask area M1 masking the moving body in the image photographed by the imaging unit being added to the first mask image 15; performing perspective transformation on the first mask image 15; setting as the first coordinate point P1 the specified vertex of the first circumscribed rectangle R1 set in the mask area M1 in the first mask image 15, setting as the second coordinate point P2 the vertex indicating the same position as that of the first coordinate point P1 among vertices of the second circumscribed rectangle R2 set in the mask area M1 in the second mask image 17 obtained by performing the perspective transformation on the first mask image 15, and correcting the first coordinate point P1 using the second coordinate point P2 to calculate the third coordinate point P3 indicating the position of the moving body in the image coordinate system, and calculating the position of the moving body in a global coordinate system by applying a position of the imaging unit in the global coordinate system to correct the third coordinate point P3.

With such a configuration, it is possible to provide a program that can estimate the position of a moving body without installing on the moving body an installation such as a sensor, marker, or transmitter/receiver used for estimating the position of the moving bod.

It should be noted that the present disclosure is not limited to the above embodiment and can be changed as appropriate without departing from the scope thereof.

For example, in the above embodiment, an example in which the position of a moving vehicle 1 is estimated is given, but it is also possible to estimate the position of a stationary vehicle 1. To estimate the position of the stationary vehicle 1, instead of the vector direction of the moving vehicle 1, the position of the stationary vehicle 1 can be estimated using, for example, the initial vector direction of the vehicle 1 estimated from the first acquired image 11 after the system is activated.

In addition, although an example in which the information processing apparatus 40 processes a two-dimensional image has been described in the above embodiment, a three-dimensional image photographed by a stereo camera or a TOF (Time Of Flight) camera may also be subject to processing.

In addition, the information processing apparatus 40 may be implemented by an apparatus contained in a single housing, or each unit of the information processing apparatus 40 may be implemented by cloud computing composed of, for example, one or more computers.

Furthermore, in the above embodiment, the image input unit 51 has been described by giving an example of accepting an input of the image 11 from the camera 10. Alternatively, for example, the input of the image 11 stored in advance in the storage unit 60 or the like may be accepted.

In addition, the present disclosure can be implemented, for example, by causing the processor to execute a computer program for the processing performed by the information processing apparatus 40.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A position estimation system comprising:
a camera configured to photograph an imaging area including a target moving body; and
a processor configured to:
    generate a first mask image by inputting a first image photographed by the camera to a trained machine learning model configured to mask the moving body in the first image, a mask area masking the moving body being added to the first mask image;
    perform perspective transformation on the first mask image;
    set as a first coordinate point a first vertex of a first circumscribed rectangle set in the mask area in the first mask image, the first vertex corresponding to a portion of the moving body;
    set as a second coordinate point a second vertex of a second circumscribed rectangle set in the mask area in a second mask image obtained by performing the perspective transformation on the first mask image, the second vertex corresponding to a same portion of the moving body as the first vertex; and
    correct the first coordinate point using the second coordinate point to calculate a third coordinate point indicating a position of the moving body in an image coordinate system.

2. The position estimation system according to claim 1, wherein the processor is further configured to correct distortion of the first image.

3. The position estimation system according to claim 1, wherein the processor is further configured to rotate the first image so that a vector direction of the moving body is directed to a predetermined direction.

4. The position estimation system according to claim 1, wherein the processor is further configured to remove from the first image a moved area corresponding to a distance which the moving body has moved and cut out an unmoved area including the moving body when the moving body has moved a distance exceeding a predetermined threshold.

5. The position estimation system according to claim 1, wherein the processor is further configured to, when the first mask image includes an untargeted moving body in addition to the moving body, remove from the first mask image the untargeted moving body.

6. The position estimation system according to claim 1, wherein the processor is further configured to calculate the position of the moving body in a global coordinate system by applying a position of the camera in a global coordinate system to correct the third coordinate point.

7. The position estimation system according to claim 1, wherein
the moving body is a vehicle.

8. A position estimation method comprising:
photographing, by a camera, an imaging area including a target moving body;
generating a first mask image by inputting a first image photographed by the camera to a trained machine learning model configured to mask the moving body in the first image, a mask area masking the moving body being added to the first mask image;
performing perspective transformation on the first mask image;
setting as a first coordinate point a first vertex of a first circumscribed rectangle set in the mask area in the first mask image, the first vertex corresponding to a portion of the moving body;

setting as a second coordinate point a second vertex of a second circumscribed rectangle set in the mask area in a second mask image obtained by performing the perspective transformation on the first mask image, the second vertex corresponding to a same portion of the moving body as the first vertex; and correcting the first coordinate point using the second coordinate point to calculate a third coordinate point indicating a position of the moving body in an image coordinate system.

9. A non-transitory computer readable medium storing a program for causing a computer to execute processing of:

generating a first mask image by inputting a first image photographed by a camera to a trained machine learning model configured to mask a moving body in the first image, a mask area masking the moving body being added to the first mask image;

performing perspective transformation on the first mask image;

setting as a first coordinate point a first vertex of a first circumscribed rectangle set in the mask area in the first mask image, the first vertex corresponding to a portion of the moving body;

setting as a second coordinate point a second vertex of a second circumscribed rectangle set in the mask area in a second mask image obtained by performing the perspective transformation on the first mask image, the second vertex corresponding to a same portion of the moving body as the first vertex; and correcting the first coordinate point using the second coordinate point to calculate a third coordinate point indicating a position of the moving body in an image coordinate system.

* * * * *